United States Patent [19]

Anderson et al.

[11] 3,742,264

[45] June 26, 1973

[54] MINIATURE, BEARINGLESS TACHOMETER GENERATOR WITH WEDGE COUPLING FOR RIGIDLY ATTACHING THE ROTOR TO THE DRIVE SHAFT

[75] Inventors: Richard Edwin Anderson, Lynn; Harry Gustav Swanson, Tewksbury, both of Mass.

[73] Assignee: General Electric Company, Wilmington, Mass.

[22] Filed: July 3, 1972

[21] Appl. No.: 268,530

[52] U.S. Cl. .................................. 310/42, 310/261
[51] Int. Cl. .......................................... H02k 15/00
[58] Field of Search ................... 310/152, 156, 261, 310/42, 216–218, 90; 148/31.57

[56] References Cited
UNITED STATES PATENTS

| | | | |
|---|---|---|---|
| 1,584,253 | 5/1926 | Tanner | 310/42 UX |
| 3,082,338 | 3/1963 | Turk | 310/261 |
| 3,324,321 | 6/1967 | Kober | 310/42 X |
| 3,540,945 | 11/1970 | Strnat et al. | 148/31.57 |

*Primary Examiner*—D. F. Duggan
*Attorney*—I. David Blumenfeld et al.

[57] ABSTRACT

An AC tachometer generator has a miniature, light weight rare earth permanent magnet rotor attached to a rotating shaft, the speed of which is to be measured. The rotor is supported without the use of bearings by rigidly attaching the rotor to the driving shaft by means of a wedge assembly. The coupling comprises a resilient, slotted wedge of square cross-section having a central bore which receives a tapered rod, one end of which is threaded. The threaded end is secured to the tachometer rotor. The square wedge is inserted in a corresponding opening in the driving shaft and turning of the rotor moves the tapered rod axially down the bore forcing the slotted, resilient members outward against the interior wall of the drive shaft rigidly attaching the rotor assembly to the shaft.

6 Claims, 3 Drawing Figures

PATENTED JUN 26 1973  3,742,264
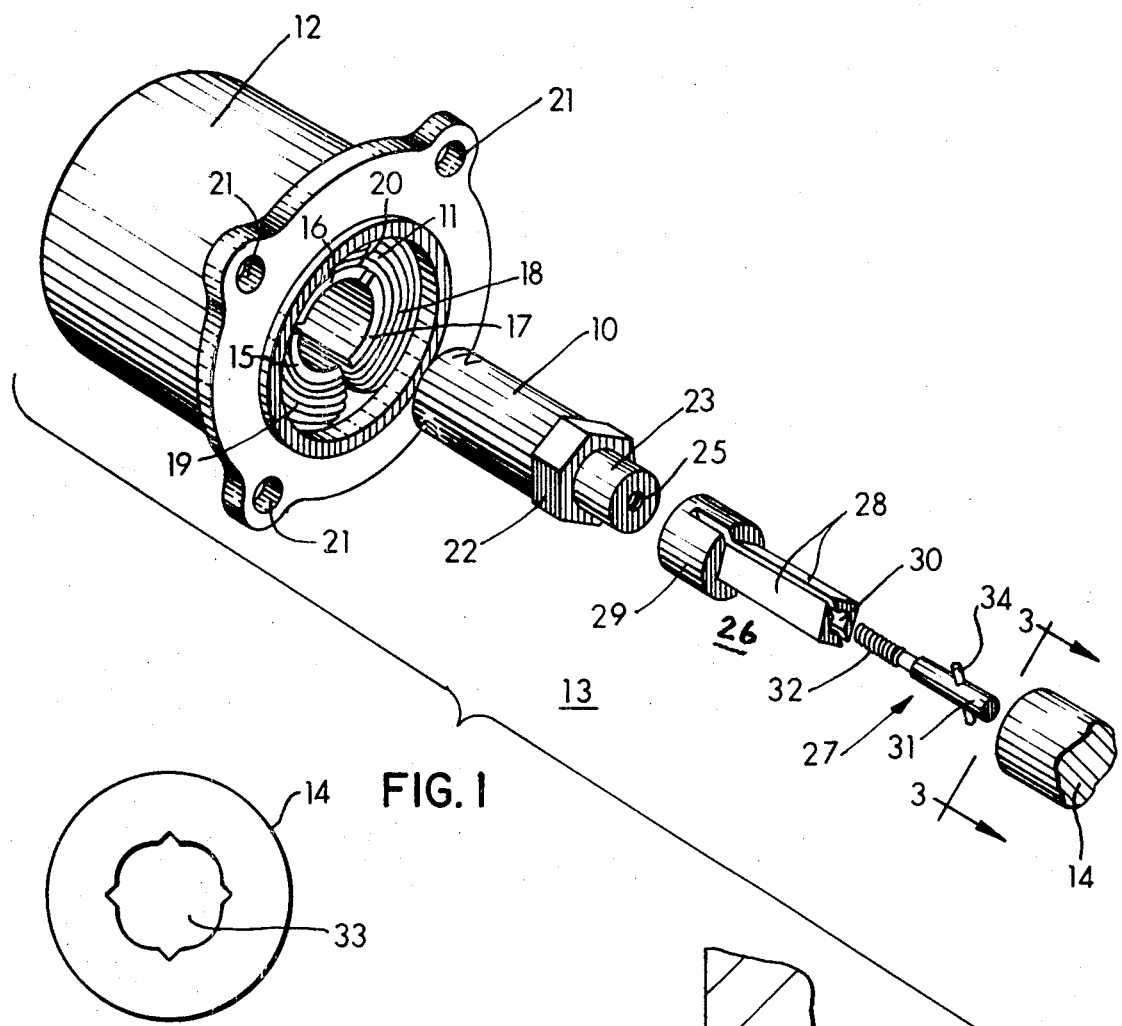
FIG. 1
FIG. 3
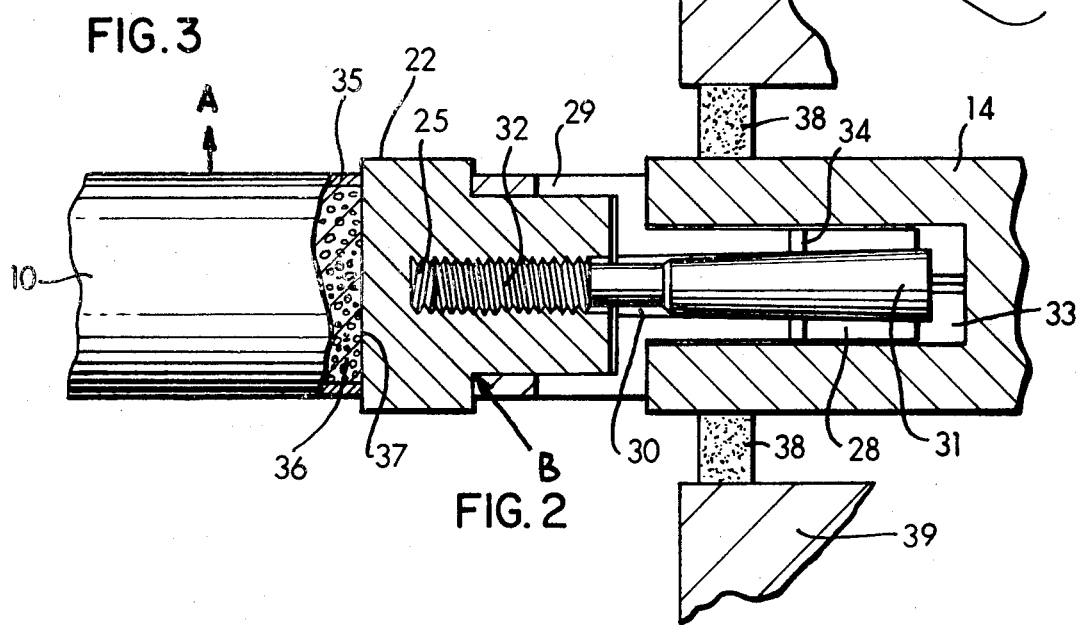
FIG. 2

MINIATURE, BEARINGLESS TACHOMETER GENERATOR WITH WEDGE COUPLING FOR RIGIDLY ATTACHING THE ROTOR TO THE DRIVE SHAFT

This invention relates to dynamoelectric machines and more particularly, to an alternating current generator particularly useful as a tachometer generator.

Tachometer generators using a permanent magnet rotor to eliminate the need for slip rings have long been utilized as speed measuring devices on aircraft and in other applications because such generators are simple in design, and rugged in construction. Typically, in a tachometer generator, a permanent magnet rotor is supported in a pair of bearings and is connected through a universal joint and a connector to the driving or engine shaft. Such an arrangement is quite adequate if the tachometer is used in an environment which is not very severe in terms of operating temperatures. However, when such tachometer generators are used in a jet engine, for example, they are operated at high speeds and under severe vibration and are subjected to operating temperatures as high as 350°F. Under such severe operating conditions the rotating elements such as the bearings and shaft connecting means are subject to a great deal of wear. Proper lubrication of these elements is difficult since lubricants deteriorate at high speeds and temperatures. Consequently, not only is there the ever present risk of damage to the tachometer due to possible bearing seizure or failure of the rotating universal joint, but frequent inspection and servicing is required in order to avoid or minimize the possibility of such damage.

In addition to the cost and inconvenience involved in frequent servicing of the tachometer bearings and rotating parts, a great deal of care has to be exercised during servicing to prevent accidental damage to the tachometer. For example, while dismantling the tachometer for servicing accidental knockdown of the rotor permanent magnet with resulting loss in magnetic output is always a possibility and requires a great deal of care to avoid. These effects on the magnetic output of the rotor can result from opening up the air gaps in the magnetic circuit of the generator during service or by exposing the rotor to stray AC or DC magnetic fields thereby demagnetizing the rotor. Because of the difficulty inherent in the repair of a generator without experiencing knockdown of the rotor, repair facilities require expensive magnetizing equipment for remagnetizing generator rotors after repair. The bearingless tachometer generator eliminates the need for such equipment.

Accordingly, the elimination of bearings and other rotating components which are subject to failure and require continuous and expensive maintenance is desirable in that a smaller, lighter, more reliable, and less costly device would then be possible. In order to achieve this result, it is desirable both to reduce the overall size, i.e., both the length and circumference of the permanent magnet rotor, and to find an effective means for rigidly attaching the rotor to the driving shaft so that bearings and other rotating members which are most subject to wear may be eliminated.

The advent of high energy, rare earth magnets such as the Cobalt-Samarium magnets which are characterized by high coercive forces and high residual fluxes make it possible to reduce the rotor to a very small size with a much larger air gap between rotor and stator, while at the same time, producing sufficient output from the tachometer generator to be useful for measuring shaft speed. Furthermore, the Cobalt-Samarium rare earth magnets are not as susceptible to knockdown of the permanent magnet as are other magnetic materials. With the reduction in size of the rotor, and the resultant miniaturization of the tachometer generator as a whole, applicant has found it possible to rigidly attach the rotor to the drive shaft by means of a unique, wedge type coupling assembly which rigidly fastens the tachometer rotor to the shaft. This eliminates the need for bearings, connectors and universal joints thereby producing a small, highly reliable tachometer construction, without modification of the standard tachometer generator mounting pad and driving means.

It is therefore, a principal objective of the instant invention to provide a miniature, bearingless tachometer generator having a rigid direct coupling between the rotor and the drive shaft.

Yet another objective of the invention is to provide a miniature, bearingless tachometer generator having a rotor fabricated of a high energy, rare earth magnet which can be rigidly coupled to the driving shaft.

Still another objective of the invention is to provide a miniature, bearingless tachometer generator having a rigid connection to the drive shaft which is easily disconnected and which will not be loosened at high speeds and under high vibration.

Still other objectives and advantages of the invention will become apparent as the description thereof proceeds.

The various objectives and advantages of the invention are realized in a tachometer generator construction having a Cobalt-Samarium permanent magnet rotor which is rigidly fastened to the driving shaft by means of a unique wedge type coupling. The mechanism comprises a slotted, resilient coupling member having a square configuration and a circular bore down the center. A tapered rod is received in the bore and the threaded end of the tapered rod is threaded in the rotor support. The coupling member is inserted in an opening in the drive shaft. The rotor and the support member is turned causing the tapered rod to move axially along the bore. Movement of the rod forces the slotted resilient wedge assembly element outwardly against the opening in the drive shaft thereby rigidly connecting the rotor to the drive shaft by virtue of the wedging action exerted by the rod on the resilient wedge element. The rotor can be easily disassembled by reversing the rotation of the magnet holder thereby removing stress from the tapered rod. The rod may then be tapped axially in the opposite direction and releasing the wedging action on the assembly wedge.

The novel features which are characteristic of this invention are set forth with particularity in the appended claims. The invention itself, however, both as to its organization and method of operation, together with other objectives and advantages thereof, may be best understood by reference to the following description taken in connection with the accompanying drawings in which:

FIG. 1 is an exploded perspective of the tachometer generator and coupling assembly;

FIG. 2 is an elevational view of the assembled rotor and drive shaft;

FIG. 3 is an end view of the drive shaft taken along the line 3—3 of FIG. 1 and shows the opening in the drive shaft for receiving the rotor coupling.

In FIG. 1, the bearingless tachometer generator is shown in exploded perspective form and comprises four principal parts namely a permanent magnet rotor 10, a stator 11, a housing 12 supporting the stator and the rotor, and a shaft coupling assembly 13 for rigidly connecting rotor 10 to a drive shaft shown generally at 14. Drive shaft 14 which, in the case of a jet engine, for example, may be driven by the jet engine rotor, drives rotor 10 to provide an output voltage from the tachometer which is proportional to the speed of the drive shaft and hence, the speed of the engine. Mounted in housing 12 is a stator which supports a cylindrical field structure of magnetic material having three equally spaced, radially projecting poles 15, 16 and 17. The radially projecting poles 15, 16 and 17 form a cylindrical air gap in which the permanent magnet rotor 10 is positioned to generate the desired output signals. Pole pieces 15, 16 and 17 which surround the rotor in magnetic relation therewith carry field windings 18, 19 and 20 which have their leads brought externally of the housing 12 through a connector not shown. Rotor 10 is driven by shaft 14 and its magnetic field generates a voltage in windings 18-20, the frequency of which is proportional to the speed of rotation of the drive shaft. This output voltage is utilized in a suitable indicating device to produce an indication of the shaft speed. Housing 12 has a mounting flange and a plurality of mounting holes 21 permit fastening of the tachometer directly to the engine housing or to a suitable mounting pad associated with the drive shaft.

Rotor 10 is a permanent magnet rotor which is magnetized along one diameter to produce north and south poles as indicated by the letters N and S in FIG. 1. To reduce the weight and size of the rotor, the rotor is preferably formed of a magnetic material having high coercive force and high residual flux. One material found to be particularly well suited for this application is a sintered alloy of rare earth materials, namely Samarium and Cobalt consisting of:

Cobalt, 63 percent
Samarium, 37 percent

Such rare earth magnets are made and sold by the General Electric Co., the assignee of the present invention, under its trade designation GECORE.

Rotor 10 is attached to a rotor support assembly 22 which cooperates with coupling 13 to fasten rotor 10 rigidly to drive shaft 14. Assembly 22 has a hexagonally shaped supporting plate to which the rotor is fastened and a short stub shaft 23 which has an internally threaded central bore 25. Stub shaft 23 cooperates with shaft coupling assembly 13, in a manner to be described presently, to move a tapered rod forming part of coupling 13 in an axial direction thereby wedging the coupling rigidly to drive shaft 14.

Rotor element 10 consists of a cylinder of sintered Cobalt-Samarium which is supported in a hollow stainless steel cylinder to which it is affixed by means of a suitable adhesive such as one of the commonly available epoxy adhesives. The magnet and supporting cylinder are mounted on the hexagonal support plate and are fixed thereto by means of an epoxy adhesive so that rotor 10 and support 22 form a single unitary assembly.

The rotor is rigidly attached to drive shaft 14 by means of the coupling assembly 13 which consists of a slotted expandable element 26 and a cooperating tapered expander member 27 which cooperate to provide the wedging action which clamp the rotor to drive shaft 14. Wedging element 26 has a square stem mounted on a partially slotted cylindrical cup 29. The stem is slotted to form two triangular shaped resilient fingers 28. Each finger has a semi-circular notch extending along the length of the slot to form a central bore 30 which is axially aligned with threaded bore 25 in rotor support assembly 22.

A movable expander member 27 is positioned in bore 30 and includes a tapered rod 31 which engages resilient fingers 28 and a threaded portion 32 which engages the threaded bore 25 of rotor support assembly 22.

Movement of rod 31 to the left forces resilient fingers 28 outward and wedges them firmly against the interior wall of drive shaft opening 33 (seen most clearly in FIG. 3). A transverse guide pin 34 extends from tapered rod 31 and rides in the slots formed by the resilient fingers 28. Guide pin 34 prevents rotation of the tapered rod within the bore and assures axial movement of the rod whenever the rotor holder is manipulated to clamp the rotor to the drive shaft.

FIG. 2 illustrates the rotor, drive shaft, and the coupling mechanism in the assembled position. Rotor 10, as pointed out previously, comprises a retaining cylinder 35, formed of stainless steel, for example, which surrounds a cylinder 36 of sintered Cobalt-Samarium. The sintered Cobalt-Samarium magnet 36 is secured to the cylinder by means of an epoxy or a similar adhesive. Rotor assembly 10 is also fastened to the surface of rotor support 22 by an epoxy adhesive or the like which is spread on the surface of the holder and cured either at room temperature by the use of suitable curing agents or by heating of the epoxy. The slotted cylindrical cup 29 which is part of assembly wedge 26 fits over stub shaft 23 of the rotor support and resilient fingers 28 are inserted in opening 33 of drive shaft 14. An oil seal 38 is positioned between shaft 14 and engine housing 39 in which the shaft is mounted. The tapered portion 31 of expander 27 is mounted in bore 30 and the threaded end 32 is received in bore 25 of the rotor support stub shaft.

FIG. 2 shows the coupling assembly in the unassembled position in that pin 31 does not exert any wedging force on resilient fingers 28 so that the entire coupling assembly fits loosely into drive shaft 14 and may be removed simply by pulling to the left. The assembly is tightened by turning rotor support member 22 so that the threaded end 32 of the wedge expander moves to the left. Tapered rod 31 also moves to the left producing a wedging action which forces resilient fingers 28 outwardly and into contact with the wall of chamber 33 in the drive shaft. The maximum diameter of the tapered rod is greater than the normal diameter of bore 30 in the assembly wedge so that by turning the rotor support the tapered rod is driven axially along the central bore producing a wedging action on fingers 28 and firmly and rigidly coupling the drive shaft and the rotor together.

The rotor may be released from the drive shaft simply by turning rotor support element 22 in the opposite direction and forcing tapered rod 31 toward the right sufficiently to remove the wedging force on resilient fingers 28 thereby releasing the rotor and rotor support assembly from the drive shaft.

It will also be apparent from the preceding description of this invention that the coupling arrangement for rigidly attaching the rotor to the shaft is not susceptible to loosening due to the radial forces produced by the rotor. That is, the radial forces (A) produced by the rotor act about fulcrum point (B) to produce tensional forces acting on the coupling will produce a tension force on threaded end 32 of the tapered rod. This tension force on the threaded end simply tends to pull the tapered rod further to the left moving the rod further into the bore of the wedge assembly and increasing the wedging force against the resilient fingers. Thus, the tension forces produced by the radial forces of the rotor simply increased the holding force. This, of course, is highly desirable in that the reliability and general effectiveness of the coupling assembly is thereby enhanced.

It will be apparent therefore, that this coupling mechanism which rigidly attaches the rotor to the drive shaft makes it possible to provide a miniature, bearingless, tachometer arrangement in which all rotating elements which are subject to friction, wear and breakdown have been eliminated. A simple, effective, and highly reliable tachometer generator which is capable of operating in even the most severe temperatures and speed environments is thereby made possible.

While a particular embodiment of this invention has been shown and described above, it will, of course, be understood that the invention is not limited thereto since many modifications in the elements and mechanisms employed may be made. It is contemplated by the appended claims to cover any such modifications which fall within the true spirit and scope of this invention.

What is claimed as new and desired to be secured by Letters Patent of the U.S. is:

1. A bearingless alternating current tachometer generator comprising:
   a. a stator having a plurality of pole pieces defining an air gap and field windings positioned on each of the pole pieces,
   b. a rotor assembly including a cobalt samarium cylindrical permanent magnet magnetized along a diameter of the cylinder positioned in the stator air gap,
   c. means for rigidly attaching the rotor assembly to a driving member so that the rotor is supported solely by the driving member including:
      1. an expandable wedge element for engaging an opening in the driving member having a pair of resilient fingers which may be moved outwardly to engage the driving member,
      2. a movable expander member attached to the rotor and engaging the resilient fingers,
      3. means to produce movement of said expander to force the resilient fingers outwardly and wedge them firmly into the opening in said driving member.

2. The bearingless alternating current tachometer generator according to claim 1 wherein said expander is positioned between said resilient fingers.

3. The bearingless alternating current tachometer generator according to claim 2 wherein each of said resilient fingers has a notch along the length thereof of said notches forming a bore for receiving said expander.

4. The bearingless alternating current tachometer generator accordin to claim 3 wherein said bore is cylindrical and said expander member includes a tapered rod element for forcing said resilient fingers outward as said tapered rod element moves along said bore.

5. The bearingless alternating current tachometer generator according to claim 3 wherein said expander member has a threaded portion for attachment to said rotor assembly and a tapered portion for forcing said resilient fingers outwardly upon movement of said expander along said bore.

6. The bearingless alternating current tachometer generator according to claim 5 wherein said rotor assembly includes a support member for said cylindrical permanent magnet, said support member having an internally threaded bore for receiving the threaded portion of said expander whereby turning of the said support relative to said expandable element causes said expander to move axially along the bore formed between said resilient fingers.

* * * * *